(12) United States Patent
Maker et al.

(10) Patent No.: US 6,480,333 B1
(45) Date of Patent: Nov. 12, 2002

(54) DIFFRACTIVE OPTICAL ELEMENTS ON NON-FLAT SUBSTRATES USING ELECTRON BEAM LITHOGRAPHY

(75) Inventors: Paul D. Maker, Arcadia; Richard E. Muller, Altadena; Daniel W. Wilson, Glendale, all of CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/196,612

(22) Filed: Nov. 18, 1998

Related U.S. Application Data (60) Provisional application No. 60/066,644, filed on Nov. 19, 1997.

(51) Int. Cl.[7] ................................................. G02B 5/18
(52) U.S. Cl. ...................... 359/570; 359/569; 359/571; 359/574
(58) Field of Search ................................ 359/569, 565, 359/570, 571, 572, 566, 574; 356/305, 328

(56) References Cited

U.S. PATENT DOCUMENTS

| | | | | |
|---|---|---|---|---|
| 4,330,175 A | * | 5/1982 | Fujii et al. ................... | 359/571 |
| 4,798,446 A | * | 1/1989 | Hettrick ....................... | 359/572 |
| 5,004,673 A | * | 4/1991 | Vlannes ....................... | 430/325 |
| 5,161,057 A | * | 11/1992 | Johnson ....................... | 359/571 |
| 5,393,634 A | * | 2/1995 | Maker et al. ................. | 359/565 |
| 5,801,795 A | * | 9/1998 | Ogino .......................... | 359/570 |
| 5,978,140 A | * | 11/1999 | Maruyama .................... | 359/569 |
| 6,100,974 A | * | 8/2000 | Reininger ..................... | 356/300 |

FOREIGN PATENT DOCUMENTS

| | | | | |
|---|---|---|---|---|
| JP | A 0117511 | * | 7/1983 | .................. 359/571 |
| RU | 0387319 | * | 6/1973 | .................. 359/570 |

OTHER PUBLICATIONS

L. Mertz, "Concentric Spectrographs", Applied Optics, vol. 16, No. 12, pp. 3122–3124, Dec. 1977.*

* cited by examiner

*Primary Examiner*—Cassandra Spyrou
*Assistant Examiner*—John Juba, Jr.
(74) *Attorney, Agent, or Firm*—Fish & Richardson P.C.

(57) ABSTRACT

The present disclosure describes a technique for creating diffraction gratings on curved surfaces with electron beam lithography. The curved surface can act as an optical element to produce flat and aberration-free images in imaging spectrometers. In addition, the fabrication technique can modify the power structure of the grating orders so that there is more energy in the first order than for a typical grating. The inventors noticed that by using electron-beam lithography techniques, a variety of convex gratings that are well-suited to the requirements of imaging spectrometers can be manufactured.

14 Claims, 9 Drawing Sheets

DIFFRACTIVE OPTICAL ELEMENTS ON NON-FLAT SUBSTRATES USING ELECTRON BEAM LITHOGRAPHY

CROSS-REFERENCE TO RELATED APPLICATIONS

This application claims benefit of the priority of U.S. Provisional Application Serial No. 60/066,644, filed Nov. 19, 1997 and entitled "Diffractive Optical Elements on Non-Flat Substrates by Electron Beam Lithography."

ORIGIN OF INVENTION

The invention described herein was made in performance of work under a NASA contract, and is subject to the provisions of Public Law 96-517 (35 U.S.C. 202) in which the Contractor has elected to retain title.

TECHNICAL FIELD

The present specification generally relates to diffractive optical elements. More particularly, the present specification describes diffractive optical elements on non-flat substrates using electron-beam lithography.

BACKGROUND

The elements that shape a propagating wavefront are a key part of any optical system. Diffractive optical elements offer major advantages over conventional refractive optical elements in terms of size, weight, and cost. Bulky groups of classical optical elements, such as lenses, mirrors, beam-splitters and filters, are replaced by a single, planar diffractive optical element. As a result, optical systems can be made smaller, more robust and less expensive. In addition, these devices can perform complex waveshaping functions that are often beyond the capabilities of conventional elements.

A diffractive optical element is a complex pattern of sub-micron structures which can modulate and transform light in a predetermined way. The element utilizes ultra-precision surfaces that have a series of zones, which have extremely small steps at the zone boundaries. The placement of these zones allows an optical designer to precisely shape the emerging optical wavefront. The required step heights at the zone boundaries are typically between 1 and 10 $\mu$m.

A tool with very high resolution and large flexibility is needed to manufacture micro-structures with arbitrary shapes. A direct-write electron beam lithography system can be used to fabricate diffractive optical elements. In electron beam lithography, a resist is exposed with a focused beam of electrons. A computer-program converts the calculated phase data to electron beam exposure doses. The beam diameter can be focused down to about 10 to 50 nm.

SUMMARY

The present disclosure describes diffractive optical elements having diffraction gratings on curved surfaces with electron beam lithography. The curved surface can act as an optical element to produce flat and aberration-free images in imaging spectrometers. In addition, the fabrication technique can modify the power structure of the grating orders so that there is more energy in the first order than exists for a typical grating. The inventors noticed that by using electron-beam lithography techniques, a variety of convex gratings that are well-suited to the requirements of imaging spectrometers can be manufactured.

The present disclosure describes an optical grating having a non-flat substrate. A film of resist is coated on top of the substrate, e.g., a plano-convex lens, using a standard semiconductor fabrication spin-coater. The resist is etched to form at least one region of blazed surface. Each region preferrably has a blazed surface with same blaze angle.

The substrate is made of glass, aluminum, or both. The curvature or the sphericity of the substrate is low. In a preferred embodiment, the film of resist is made of a special Plexiglass material called polymethyl methacrylate "PMMA". The film of PMMA has a thickness of about 2 to 3 $\mu$m.

In a particular embodiment, the film of resist is etched to form a single region of blazed surface such that the blaze angle stays constant with respect to the local grating surface. In another particular embodiment, the film of resist is etched to form a grating with two concentric blaze regions having a middle region and an outer ring region such that the total grating area is split into two concentric regions with different blaze angles. The middle region occupies approximately 33% of the total area and the outer ring region the remaining 67%. In a preferred embodiment, the film of resist is etched to form a grating with a groove having two segments. The two segments share a common region. Each segment has a different slope to broaden the second order wavelength response.

In addition, this device allows two different kinds of modification to the incoming light, focusing from the lens part and diffraction from the grating parts.

In a preferred embodiment, the etching means used is an electron-beam fabrication technique. The tool used in the electron-beam technique is about 50 kV, 2 mA, 0.5 $\mu$m beam.

The present disclosure also includes a method of manufacturing an optical grating. The method includes laying a curved substrate, coating a film of resist on top of the curved substrate using a standard semiconductor fabrication spin-coater, and etching the resist to form at least one region of blazed surface. The method of etching the resist on a curved surface include predetermining focus, X- and Y-deflector gain calibration, and X- and Y-deflector rotation calibration of an electron-beam writer. The method also includes laying down calibration marks on said curved surface, and exposing the grating pattern on the curved surface.

The present disclosure also includes an imaging spectrometer that has an input slit for passing beams of light, and a set of mirrors. A first mirror is used to reflect the beams of light. A second mirror is an optical grating described above. A third mirror is used to reflect a wavefront of light formed by the optical grating. The spectrometer also includes a plate for processing the spectrum of wavefront of light reflected by the third mirror. In a preferred embodiment, the spectrometer is of an Offner type. This Offner spectrometer includes an input slit that is 1 cm long and a grating that covers the wavelength band of approximately 0.4 to 1.0 $\mu$m in the second order and approximately 1.0 to 2.5 $\mu$m in the first order. The grating in the spectrometer has a substrate curvature of approximately 0.0146 mm$^{-1}$. The spectrometer also has an angle of incidence of approximately 25 degrees and a pitch of about 20.7 $\mu$m.

The details of one or more embodiments are set forth in the accompanying drawings and the description below. Other embodiments and advantages will become apparent from the following description and drawings, and from the claims.

BRIEF DESCRIPTION OF THE DRAWINGS

Like reference numbers and designations in the various drawings indicate like elements.

DETAILED DESCRIPTION

The advantages of spectrometer forms that use concentric surfaces have been recognized for their potential for providing good optical correction and compact size. However, these concentric spectrometers require very low distortion. The spectral response function of a pixel must be known with great accuracy. A small uncertainty in the location of the peak of this function can lead to significant error in the calculated pixel radiance. The above requirements are satisfied by using spectrometer designs based on an Offner concentric spectrometer form.

Figure 1:
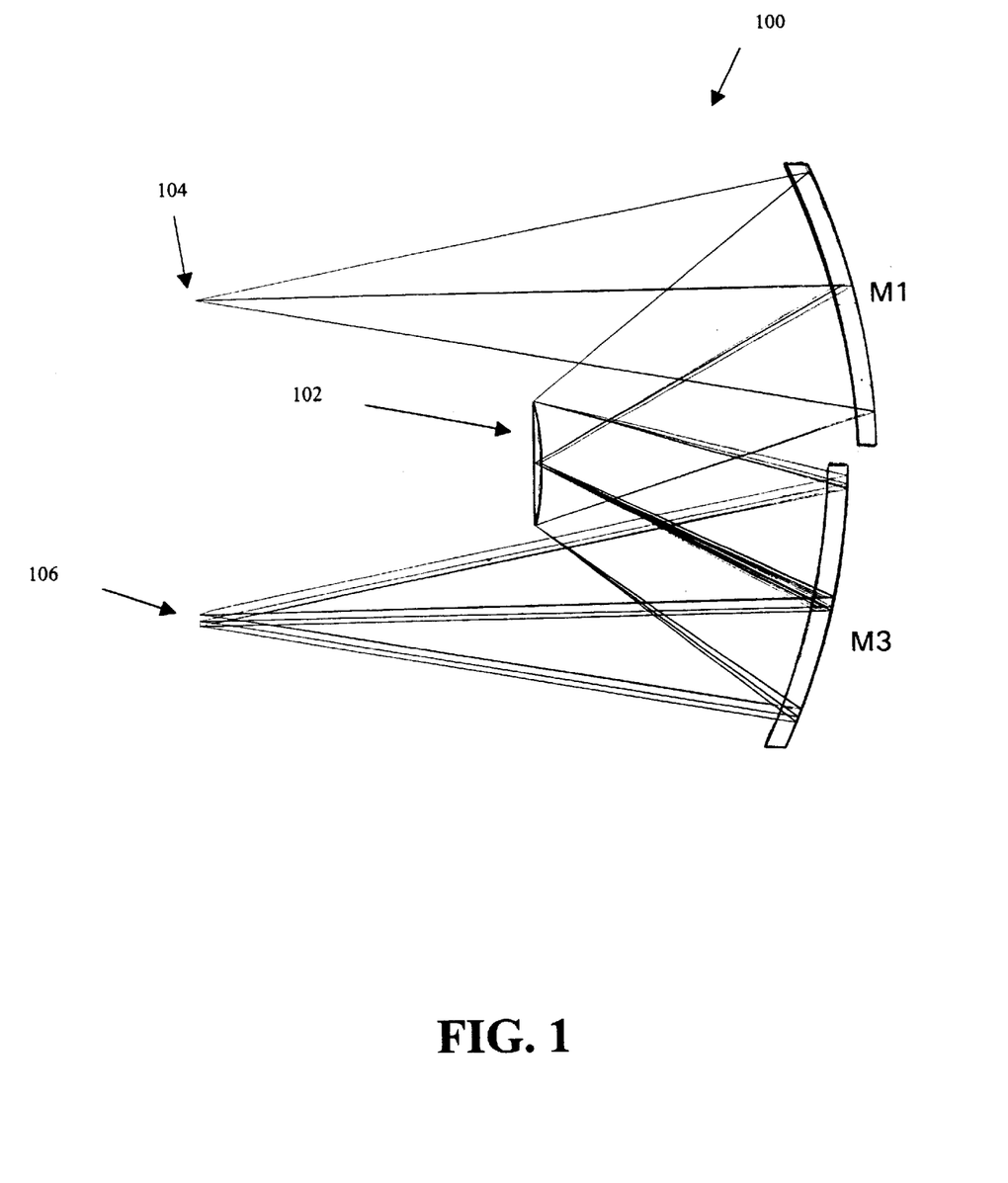
FIG. 1 illustration of a typical Offner spectrometer ray trace.

A typical Offner spectrometer ray trace 100 is shown in FIG. 1. The grating 102 is the aperture stop, and is on the second mirror. The design is telecentric, with a nominal magnification of −1. The example shown in FIG. 1 achieves nearly diffraction-limited image quality and sub-micron distortion over the wavelength band of about 0.4 to 1.0 $\mu$m with an f-number of 2.8, slit length 104 of 1.2 cm and spectral resolution 106 of 3 nm using 12 $\mu$m square pixels and 1000 spatial pixels.

The inventors noticed that the advantages of the Offner spectrometer form can be made possible by a reliable and flexible method of generating gratings on curved substrates. However, it is difficult to produce well-blazed curved gratings. These difficulties are exacerbated in concentric spectrometer designs in which the grating must typically cover an arc that is greater than the blaze angle itself. Depending on the f-number of the system, the arc which the grating must cover is generally more than a few degrees.

The inventors found that by using electron-beam lithography techniques, a variety of convex gratings that are well-suited to the requirements of concentric spectrometers can be manufactured. The techniques enable the practical realization of the well-blazed curved gratings on concentric spectrometers. The electron-beam lithography offers a way of making grating on such convex substrates that is considerably more flexible than ruling or holographic techniques. The electron-beam technique can produce gratings with no variation in blaze angle across the entire grating surface, independent of substrate convexity up to a certain limit.

The electron-beam technique also offers the possibility of controlling the shape of the groove in order to achieve a desired diffraction efficiency curve, and to construct multi-panel gratings with an arbitrary panel shape, number of grooves and groove spacing. All these characteristics are important in determining the image quality of an Offner imaging spectrometer.

An example of a suitable electron-beam technique used on flat surface is disclosed in U.S. Pat. No. 5,393,634, issued on Feb. 28, 1995, and entitled "CONTINUOUS PHASE AND AMPLITUDE HOLOGRAPHIC ELEMENTS," the entire content of which is incorporated herein by reference.

Figure 2A:
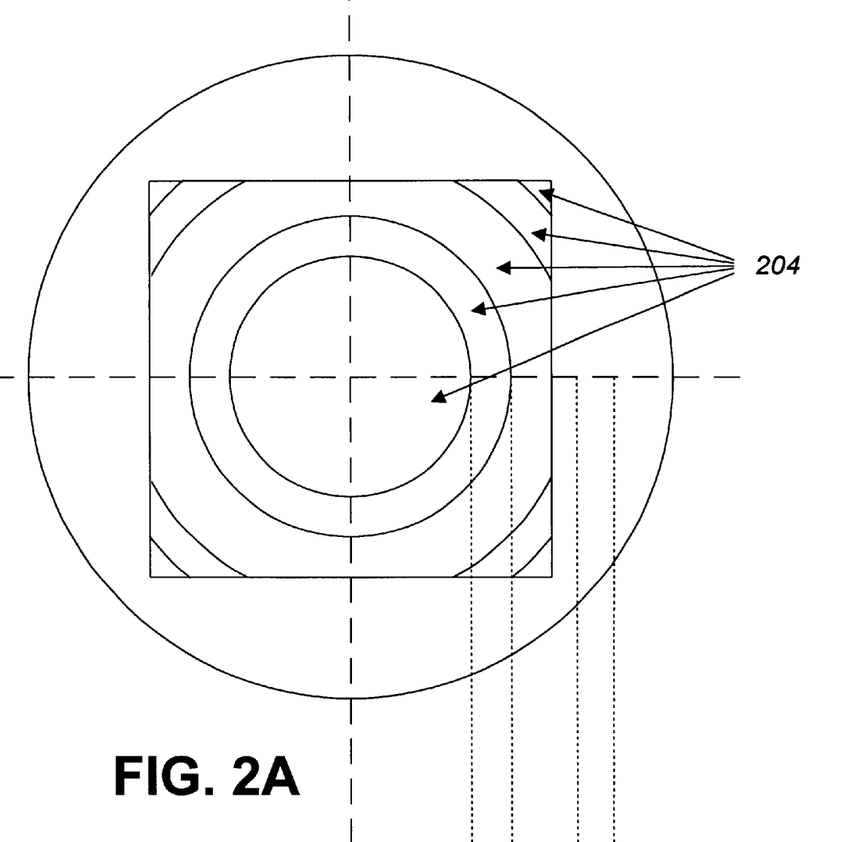
FIG. 2A is a top view of a diagram of a pattern of annular regions to be etched onto a film of resist.
Figure 2B:
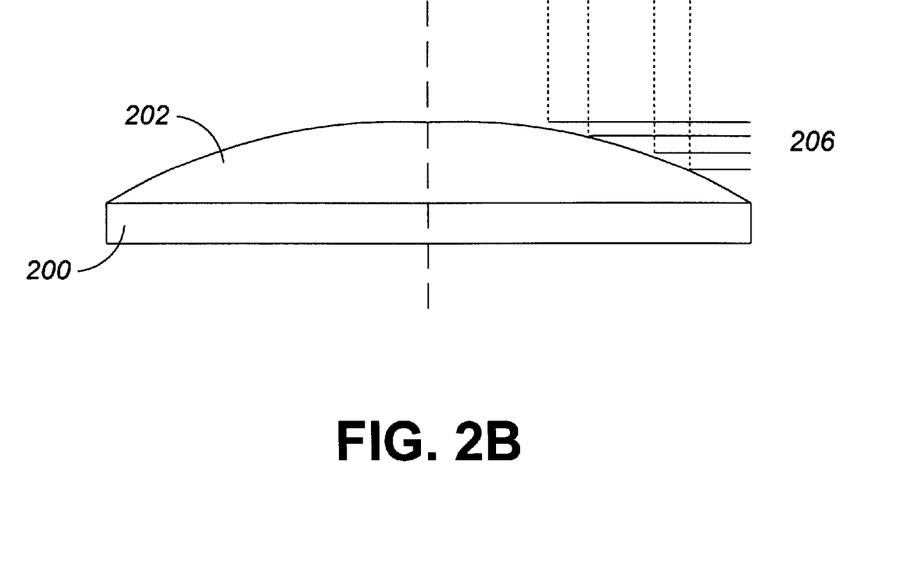
FIG. 2B is a cross-sectional view of a curved substrate.

The electron-beam fabrication method involves first coating the flat or low-sphericity substrate 200 with a thin film of about 2 to 3 $\mu$m of polymethyl methacrylate (PMMA, Plexiglas) 202 using a standard semiconductor fabrication spin-coater. In a preferred embodiment, glass and aluminum substrates are used. The grating pattern is written by an electron beam lithography tool using, typically, a 50 kV, 2 mA, 0.5 $\mu$m waist beam. In order to produce flat, blazed surfaces, it is necessary to compensate for both the nonlinear response of the PMMA and the electron-beam "proximity effect." The electron-beam "proximity effect" is an exposure produced by electrons that are back-scattered from deep within the substrate. The compensation is accomplished by careful calibration and deconvolution of the experimentally determined delta plus Gaussian instrument function. The exposed patterns are developed in pure acetone for roughly 10 seconds. Final groove depth is adjusted to the design value using incremental development steps interspersed with physical depth measurements. A final overcoat of approximately 40 nm thick aluminum is used as the reflective layer.

With curved substrates, the pattern is subdivided into narrow annular regions that can be exposed adequately at fixed electron-beam focal distance. FIG. 2A shows a top view of the pattern of the annular regions 204. Electron-beam electronic deflector circuits are carefully adjusted both for scale and rotation concurrent with the changing of the focal distance 206. Adequate precision is realized over a region that varies over approximately ±25 $\mu$m in height. FIG. 2B shows the cross-sectional view of the substrate and illustrates the transformation of the flat pattern onto the curved surface.

The above technique can be used with most commercial electron-beam writers. Predetermination of how the parameter sets such as focus, X- and Y-deflector gain calibration, and X- and Y-deflector rotation calibration vary with sample height is necessary. The predetermination process uses an array of calibration marks laid down on the convex substrate itself. Most conventional electron-beam writer control software can incorporate such data into a fully automatic, subsequent exposure of the grating on the convex substrate. The exposure times for the gratings vary between two and four hours. They depend upon the required resolution, which sets the electron-beam spot size and thus the writing current.

Figures 3A, 3B, 3C:
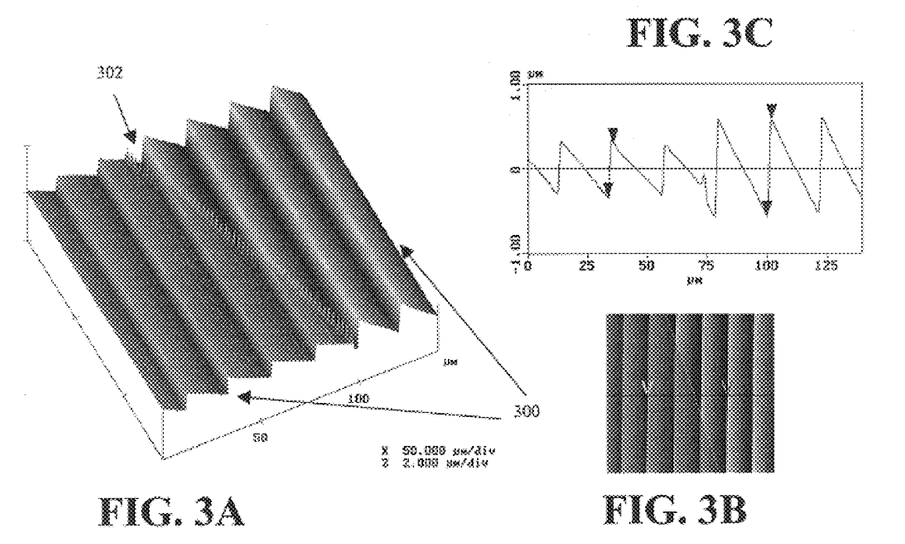
FIG. 3A is a perspective view of an atomic force microscope profile of a dual-panel blazed grating on a convex substrate.
FIG. 3B is a top view of an atomic force microscope profile of a dual-panel blazed grating on a convex substrate.
FIG. 3C is a cross-sectional view of the blazed surface.
Figure 4:
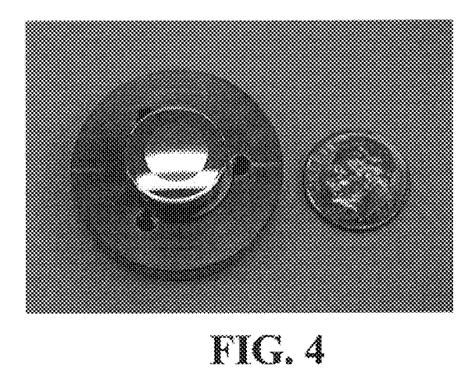
FIG. 4 shows a photo of the grating on a glass substrate.

FIGS. 3A–3C illustrate the quality of gratings that have been produced using the above techniques. FIG. 3A shows a perspective view of the atomic force microscope surface profile of a dual-panel blazed grating on a convex substrate. The figure includes the boundary between regions 300 having different blaze angles. A fine, sub-micron "picket fence" 302 of residual PMMA separates the regions. It is the result of imperfect pattern matching and/or exposure. FIG. 3B shows a top view of the blazed surface. FIG. 3C shows a cross-sectional view of the blazed surface. FIG. 4 shows the grating on a glass substrate. Note the shift of the reflected image due to the high visible-wavelength efficiency of the second order.

In a preferred embodiment, the gratings are produced according to the specifications of the Grating Imaging Spectrometer (GIS) planned for the New Millennium Earth Orbiting 1 (NM-EO1) mission. The GIS is an Offner spectrometer that has a 1 cm long slit and operates at an f-number of 7.5 (the basic design form is compatible with considerably lower f-numbers, e.g., around 2.8). It covers the wavelength band of approximately 0.4 to 2.5 $\mu$m, typical of such spectrometers. In order to achieve a compact design the entire wavelength band is covered by a single spectrometer unit. The grating is thus used in the first (1.0 to 2.5 $\mu$m) and second (0.4 to 1.0 $\mu$m) orders simultaneously. These wavelength bands and their separation are primarily determined by the spectral response of the focal plane arrays. The two orders are separated with a dichroic mirror; focal plane interference filters further aid in order and background rejection. Other parameters include substrate curvature of 0.0146 mm$^{-1}$, clear aperture diameter of 9 mm, angle of incidence of approximately 25 degrees, and a pitch of 20.7 $\mu$m.

In a particular embodiment, a true single blaze grating is used, in which the blaze angle stays constant with respect to the local grating surface normal. Such a grating cannot be produced by ruling unless the tool angle is varied continuously for every groove, which is very difficult. For a sawtooth facet profile, the blaze angle $\theta$ is the angle between the grating normal and the facet normal. It is given by the well-known equation $$\theta = (\alpha - \beta)/2, \tag{1}$$

where $\alpha$ and $\beta$ are the angles of incidence and diffraction respectively. The dependence of $\theta$ on the angle of incidence means that even with a plane grating incident light must be collimated (constant $\alpha$) in order to have true blazed grating action.

Figure 5:
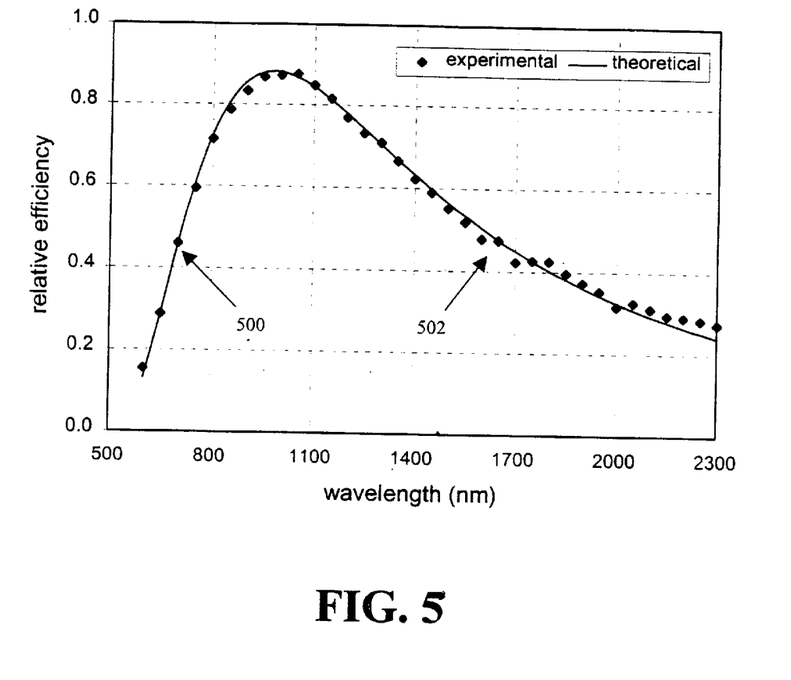
FIG. 5 is a graph of a first order diffraction efficiency of a true single blaze grating.

The first order diffraction efficiency of the true single blaze grating is shown in FIG. 5. The results are very well fitted by a theoretical curve of the form $$D_i = D_{oi} \left[ \frac{\sin\left(\pi\left(\frac{\lambda_o}{\lambda} - i\right)\right)}{\pi\left(\frac{\lambda_o}{\lambda} - i\right)} \right]^2, \tag{2}$$

where $D_i$ is the relative efficiency of the $i^{th}$ order, $D_{oi}$ the corresponding peak efficiency, and $\lambda_o$ the blaze wavelength in the first order. In fitting this curve, we allow $\lambda_o$ to vary in order to obtain the best fit. The variation in $\lambda_o$ accounts for uncertainty in the exact value of this wavelength, which is controlled by the depth of the groove. This uncertainty is typically less than 100 nm. The curve is consistent with the rule of thumb that the efficiency of the grating drops to 50% of its peak value at around $(2/3)\lambda_o$ 500 and at around $(9/5)\lambda_o$ 502.

Figure 6:
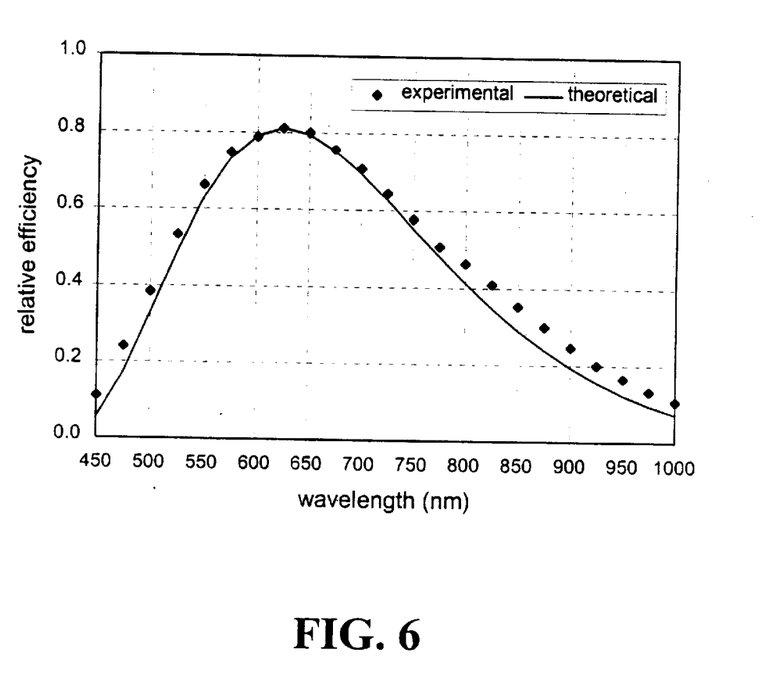
FIG. 6 is a graph of a second order diffraction efficiency of the true single blaze grating.

The second order efficiency of the single blaze grating is shown in FIG. 6. The results are again fitted with Eq. 2, for I=2. The close theoretical fit shown in FIG. 5 and FIG. 6 confirms that the grating behaves as a true single blaze one, and demonstrates the capability of the electron-beam technique to manufacture such a grating on a convex substrate.

The requirements of the NM-EO1 project in terms of broadband response could not be matched by a single blaze grating. Specifically, the second order bandwidth of a single blaze can be seen to be inadequate for the 400–1000 nm region (this is inherent in the groove profile rather than an artifact of the method). Also, in the first order, it is required that the response at 2500 nm remain as high as possible. But with a single blaze grating it is not possible to push the blaze peak towards longer wavelengths without losing completely the response at the short end. To achieve these requirements, the grating area can be split and each region blazed at a different wavelength.

Figure 7:
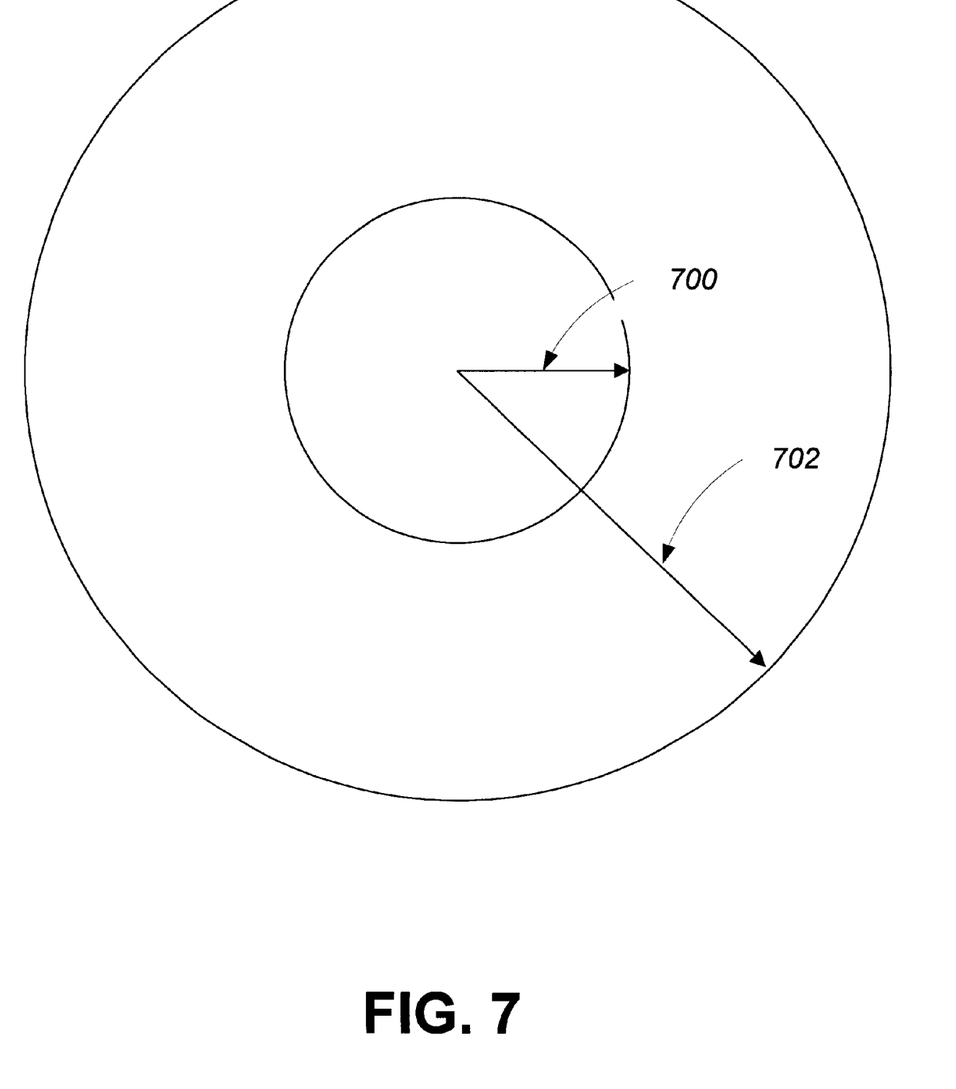
FIG. 7 is a diagram of a pattern of a dual-panel blazed grating.

The electron-beam technique allows complete flexibility in the design of the area shapes, which is important in certain applications, for example, in controlling the distortion (centroid location) accurately. In a further particular embodiment shown in FIG. 7, a grating with two concentric blaze areas is used. The middle section occupies approximately 33% of the total area and the outer ring the remaining 67%. The radius of the middle section 700 is approximately 0.577 times the radius of the outer ring 702. This dual-panel blazed gratings, which split the total grating area into two concentric regions with different blaze angles, thus provide a broader wavelength band. The two blaze wavelengths are intended to be 1000 nm (middle) and 1800 nm (outer ring).

Figure 8:
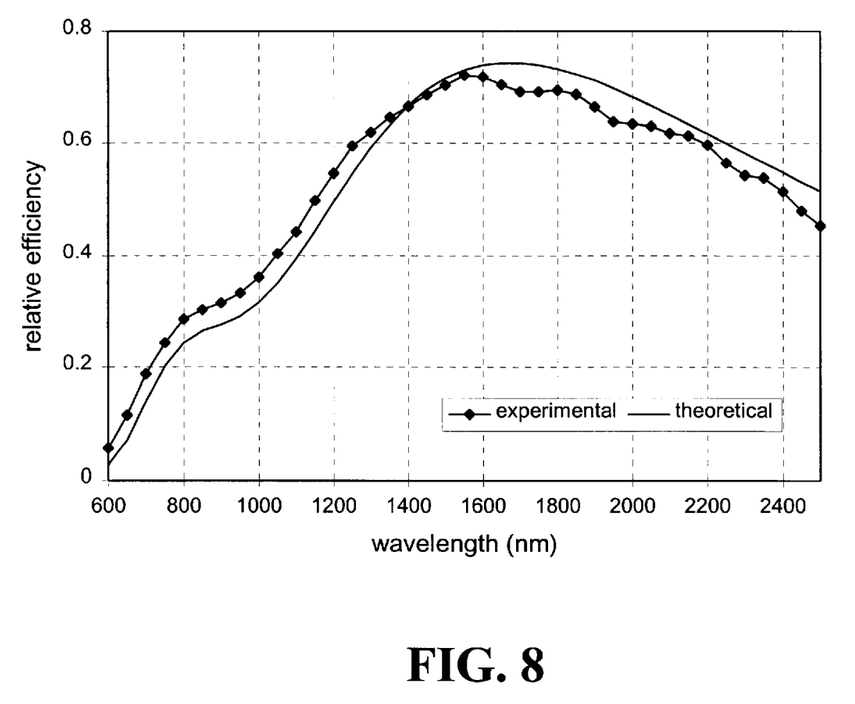
FIG. 8 is a graph of a first order diffraction efficiency of the dual-panel blazed grating.
Figure 9:
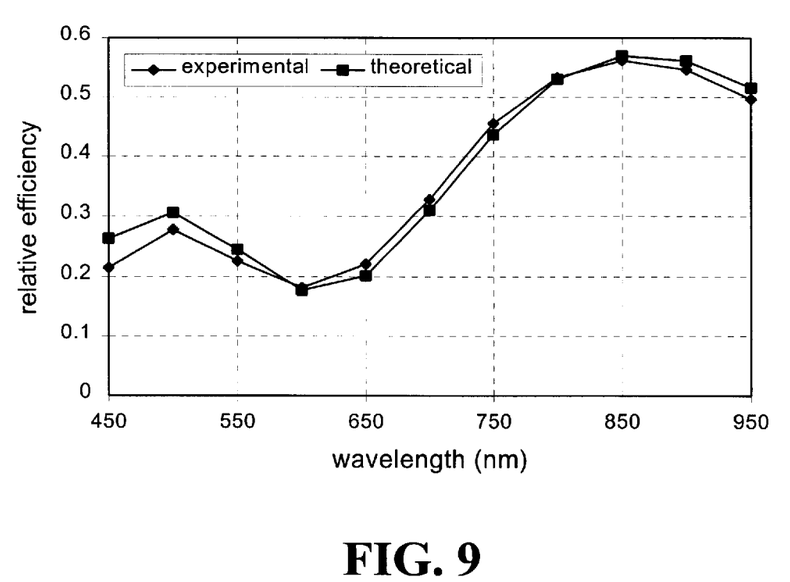
FIG. 9 is a graph of a second order diffraction efficiency of the dual-panel blazed grating.

FIG. 8 shows the first order efficiency of this grating, and FIG. 9 the second order. The theoretical fits are provided by the equation $$D = D_{oi}(0.33 D_{ai} + 0.67 D_{bi}). \tag{3}$$

In this equation, the subscripts a and b stand for the two different blaze areas, D is the total diffraction efficiency, $D_{ai}$ and $D_{bi}$ the first (or second) order efficiencies of the middle and outer sections respectively, as given by Eq. 2 for each order (I=1,2). The blaze wavelengths were adjusted slightly to account for inaccuracies in the fabrication. The values used were 970 nm and 1740 nm. The peak efficiency ($D_0$) for each blaze was taken as 88% in the first order and 85% in the second order.

The close theoretical fits for the experimental values shown in FIG. 8 and FIG. 9 confirm that the two blaze areas can be added incoherently (through Eq. 3) for the purpose of measuring diffraction efficiency, and provide a very simple way of designing the response of such gratings. Thus this grating provides a high efficiency over a broad wavelength range.

Figure 10:
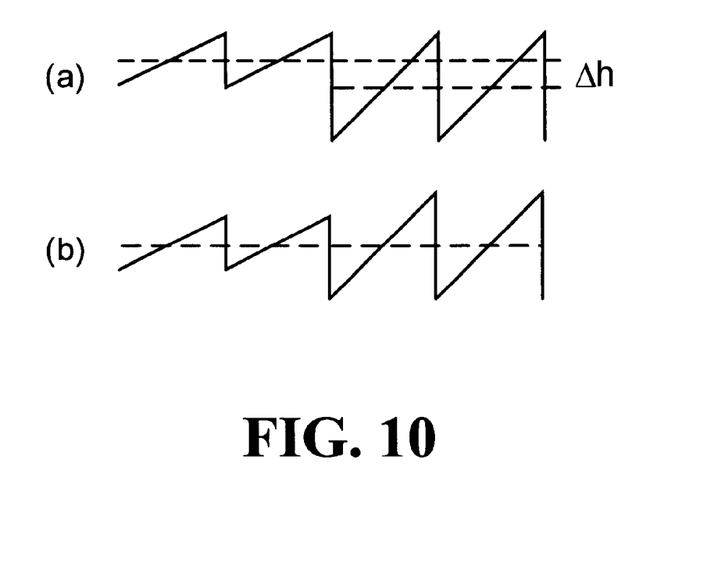
FIG. 10(a) is an example of two different blaze areas in a ruled grating.
FIG. 10(b) is an example of two different blaze areas in a grating etched with electron-beam technique.

The electron-beam technique provides an additional unique advantage of being capable of controlling the average diffracted phase from the different blaze areas. For a ruled grating, the rulings between two different blazes will tend to match at the peaks as in FIG. 10(*a*). However, with the electron-beam technique it is possible to control the average height separately from the groove angle and depth, thus resulting in the profile shown in FIG. 10(*b*). In this latter case, the mean heights are matched, thus leading to a zero mean phase difference between the two blazes. Such matching is subject to fabrication error, but the mean phase difference can still be made considerably smaller than would be the case with a ruled grating.

In the Offner design, any difference in intensity between the two blaze areas represents a pupil apodization, and therefore can have an appreciable effect on the distortion characteristics which are crucial for imaging spectrometry applications. The effect is further complicated because the mean relative phase of the two areas also enters the calculation. Fourier transformation of the grating profile reveals that for a single blaze area the mean diffracted phase alternates between zero and $\pi$ whenever the diffraction efficiency goes to zero. If the mean heights of the two blazes are matched exactly, then they add in phase within the area of overlap of the main lobes of the diffraction efficiency curves. This holds in both the first and the second order. If the heights are not exactly matched, then the residual mismatch translates into a phase difference between the two areas, which scales inversely with wavelength.

The dephasing and apodization problems caused by the two panel blaze areas are absent in a single blaze design. However, a single blaze design does not have the necessary broad band response, especially in the second order. An alternative way of broadening the second order band is to modify the groove shape away from the sawtooth profile. This will in general reduce the peak efficiency.

Figure 11:
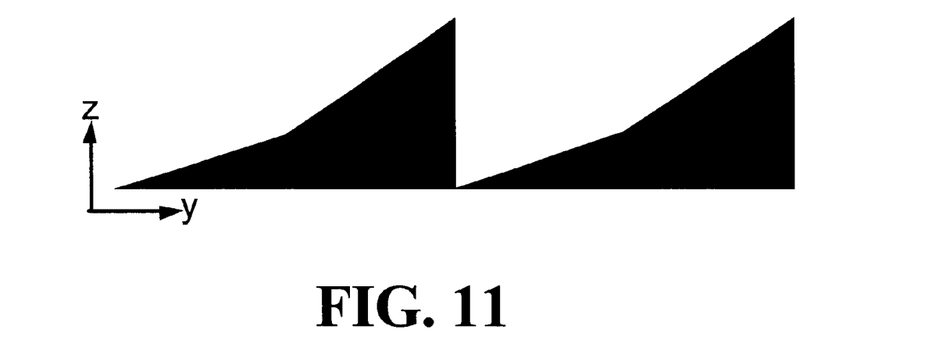
FIG. 11 is an illustration of a dual-angle blazed grating surface with a groove having two segments.

The profile shown in FIG. 11 is a preferred embodiment called "dual-angle" blazed grating. The dual-angle blazed grating incorporates a groove with a compound profile having two segments with different slopes. This has the effect of broadening the wavelength response band, especially in the second order. The flexibility afforded by the electron-beam technique in modifying the groove shape to a desired profile is evident here.

Figure 12:
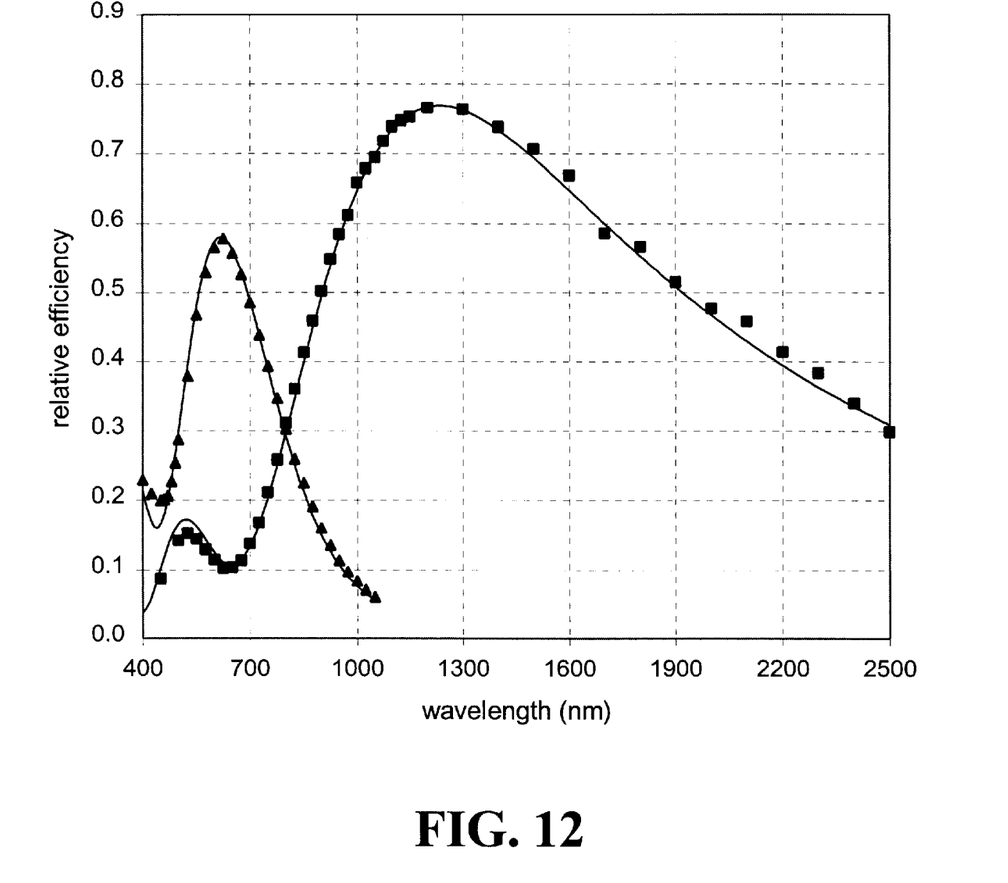
FIG. 12 is a graph of first and second order diffraction efficiencies of the dual-angle blazed grating.

The diffraction efficiency of the dual-angle blazed grating is shown in FIG. 12. The figure also shows theoretical curves, which were derived from the Fourier transform of the grating profile. This grating provides an acceptable efficiency down to 400 nm, which was impossible to do with the single blaze. A slight shift of the blaze peak towards the longer wavelengths is possible, as the efficiency below 400 nm is expected to show a secondary peak. This also improves the efficiency around 1000 nm.

The advantageous features of the electron-beam grating can be shown by comparing (see FIG. 13) the diffraction efficiencies of the dual panel 1300 and dual-angle 1302 blaze gratings with ruled 1304 and holographic 1306 gratings that were manufactured to the same specifications. The ruling was over three panels. A simple calculation of the blaze angle from Eq. 1, taking into account the angles of incidence and diffraction as well as the substrate convexity, reveals that the blaze wavelength would be expected to vary between 1 and 2.4 $\mu$m approximately within each panel, assuming a fixed tool cutting angle for a single panel and appropriate adjustment from one panel to the next.

Figure 13:
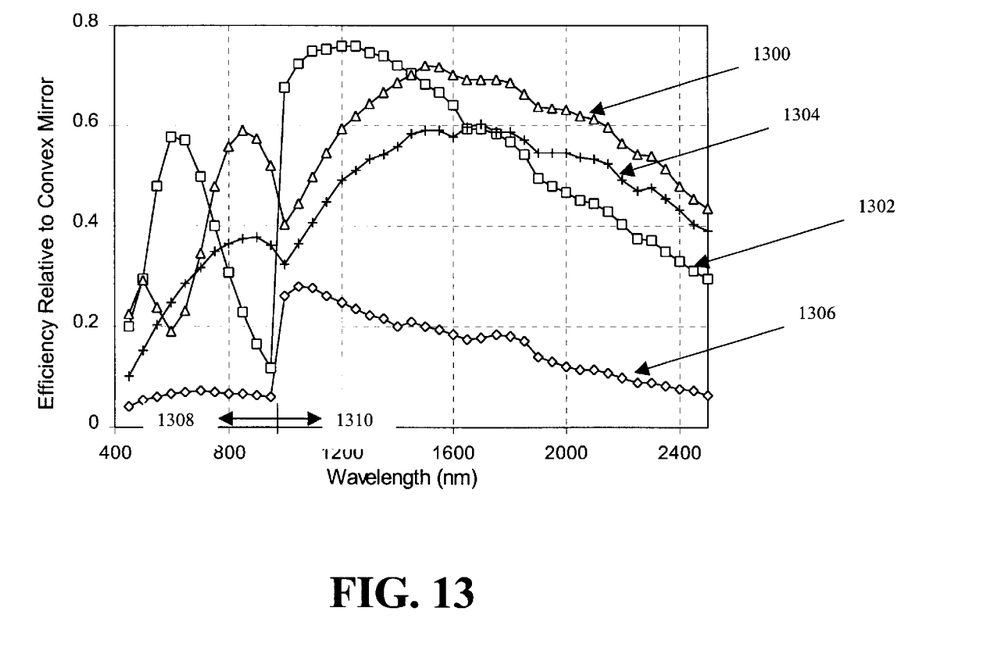
FIG. 13 is a graph of a comparison of diffraction efficiencies between four different types of gratings.

The diffraction efficiency comparison is shown in FIG. 13, where both first 1308 and second 1310 order results are included in a same curve for brevity and clarity. The efficiency up to 1 $\mu$m is that of the second order; above, that of the first order. It can be seen that the highest peak efficiency is provided by the dual-angle blazed grating, while the dual-blaze grating gives the best overall efficiency within the bands of interest. A similar broadband response is obtained by the ruled grating, due to the variation in blaze angle that is inevitable with this type. The holographic grating was not an enhanced (ion-etched) type and had limited maximum attainable efficiency.

Compared to the ruled and holographic gratings, electron-beam gratings exhibited extremely low scatter. Using a HeNe laser and a 100 $\mu$m slit in front of a photodetector, scatter from the electron-beam grating was not measurable while that from both the ruled and the holographic gratings was clearly measurable.

A number of embodiments of the present disclosure have been described. Nevertheless, it will be understood that various modifications may be made without departing from the spirit and scope of the invention. Accordingly, other embodiments are within the scope of the following claims.

What is claimed is:

1. An optical grating comprising:
   a curved substrate having a plurality of annular regions; and
   at least one region of said plurality of annular regions blazed using electron beam lithography to form a diffraction grating on said curved substrate, each of said at least one region having same blaze angle with respect to a local grating surface normal, such that electron beam lithography produces the diffracting grating with substantially small variations in blaze angle within each of said at least one region,
   wherein each region of said at least one region of blazed surface has two segments, said two segments having different slopes to broaden the second order wavelength response.

2. The optical grating of claim 1, wherein the substrate is convex.

3. The optical grating of claim 1, wherein the substrate is one of glass or aluminum or both.

4. The optical grating of claim 1, wherein the substrate is made of low curvature material.

5. An optical grating comprising:
   a curved substrate having a plurality of annular regions; and
   at least one region of said plurality of annular regions blazed to form a diffraction grating on said curved substrate, each of said at least one region having the same blaze angle with respect to a local grating surface normal and having substantially small variations in blaze angle within each of said at least one region,
   wherein each region of said at least one region of blazed surface has two segments, said two segments having different slopes to broaden the second order wavelength response.

6. The optical grating of claim 5, wherein the substrate is convex.

7. The optical grating of claim 5, wherein the substrate is one of glass or aluminum or both.

8. The optical grating of claim 5, wherein the substrate is made of low curvature material.

9. An optical grating comprising:
   a curved substrate having a plurality of annular regions; and
   at least one region of said plurality of annular regions blazed to form a diffraction grating on said curved substrate, each of said at least one region having the same blaze angle with respect to a local grating surface normal with substantially small variations in blaze angle within each of said at least one region,
   wherein each region of said at least one region of blazed surface has two segments, said two segments having different slopes to broaden the second order wavelength response.

10. The optical grating of claim 9, wherein the substrate is convex.

11. The optical grating of claim 9, wherein the substrate is one of glass or aluminum or both.

12. The optical grating of claim 9, wherein the substrate is made of low curvature material.

13. An optical grating comprising:

a curved substrate having a plurality of annular regions; and at least one region of said plurality of annular regions blazed using electron beam lithography to form a diffraction grating on said curved substrate, each of said at least one region having same blaze angle with respect to a local grating surface normal, such that electron beam lithography produces the diffracting grating with substantially small variations in blaze angle within each of said at least one region, wherein each region of said at least one region of blazed surface has a compound profile.

14. The optical grating of claim 13, wherein the substrate is convex.

* * * * *